June 18, 1968 M. J. H. STAAR ET AL 3,388,632

CASSETTE FOR STORING SOUND SUPPORT TAPE

Original Filed May 10, 1965 2 Sheets-Sheet 1

June 18, 1968 M. J. H. STAAR ET AL 3,388,632

CASSETTE FOR STORING SOUND SUPPORT TAPE

Original Filed May 10, 1965 2 Sheets-Sheet 2

United States Patent Office 3,388,632

Patented June 18, 1968

3,388,632

CASSETTE FOR STORING SOUND SUPPORT TAPE

Marcel Jules Helene Staar, Rhode-Saint-Genese, Belgium, assignor to Usines Gustave Staar Societe Anonyme, Brussels, Belgium Continuation of application Ser. No. 454,355, May 10, 1965. This application Aug. 21, 1967, Ser. No. 662,189
Claims priority, application Belgium, May 11, 1964, 647,747/64
12 Claims. (Cl. 88—28)

ABSTRACT OF THE DISCLOSURE

The combination of a standard slide transparency and a cassette having a hollow support for a sound tape. The slide transparency and the cassette being removably connected directly to one another either temporarily by means of a rib molded on the cassette and engageable in an aperture in the slide transparency or permanently by adhesive means applied to the slide transparency and/or the cassette.

This application is a continuation of application Ser. No. 454,355, filed May 10, 1965, now abandoned.

This invention relates to cassettes for storing sound recording tapes for playing during the projection of slides.

Slide mounting frames formed with a recess or the like for storing a sound tape have been disclosed in applicant's application No. 361,746 filed Apr. 22, 1964, now Patent No. 3,352,204. In the meantime, the applicant has felt that a savings would be possible if the user could himself form systems of the kind comprising a slide and a sound accompaniment from slide support frames, more particularly of the standard kind. By "standard slide frame" in the following text is meant a simple frame consisting of two flat cardboard members with windows, these members sandwiching a transparency therebetween.

According to the invention, a cassette for storing sound tape has provision for readily making a semi-permanent or permanent connection in an accurate justaposed relationship with a slide frame which may or may not be specially contrived for this purpose.

By "ready connection" is meant any operation within the scope of the user.

In addition to the advantage just outlined, an advantage of using conventional slide frames to form combined systems formed with a recess for a sound tape is that there is no longer any need to adapt the sound projection equipment to the projection of slides whose mounting frame is not of the same size as that for which the projector is normally intended; consequently, the same projector can be used for slides alone and sound slides.

For a better understanding of the invention, two embodiments of systems devised in accordance with the invention will be described hereinafter.

In the drawings:

FIGS. 1–7 relate to a semi-permanent connection and FIGS. 8–13A to a permanent connection;

Figure 1:
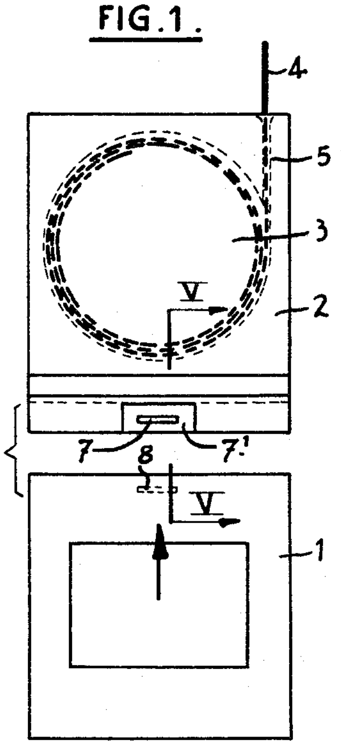
FIGS. 1 and 2 are elevation views of the system, the slide frame being in the separated position (FIG. 1) and in the assembled position (FIG. 2) with the cassette.
Figure 2:
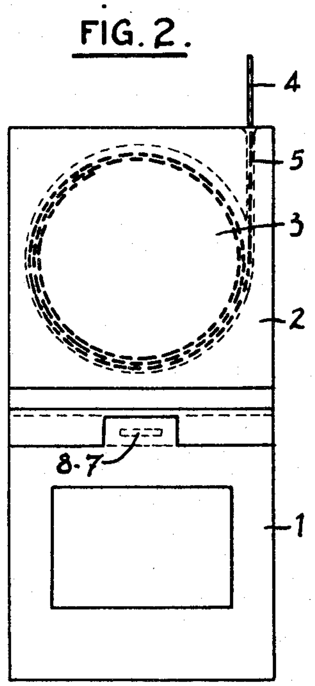
Figure 3:
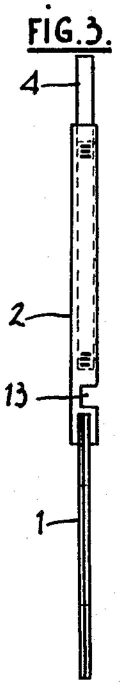
FIG. 3 is a side elevation of the same system.
Figure 4:
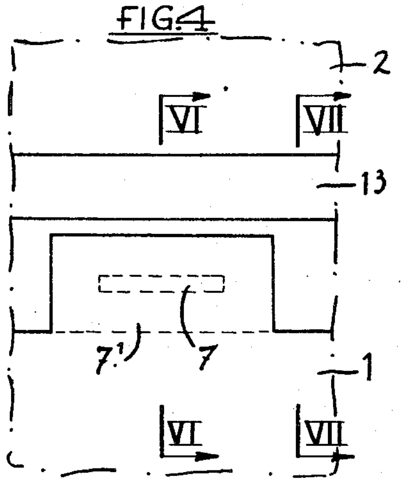
FIG. 4 shows a detail of the engaging part of the cassette and slide.
Figure 5:
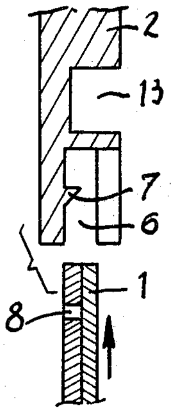
FIG. 5 is a section on the line V—V of FIG. 1.

In the accompanying drawings, there can be seen a mounting frame 1 for conventional slides and a cassette 2 formed with a recess or the like 3 (FIGS. 1–3) for storing a sound tape 4. According to applicant's application No. 321,013 filed Nov. 4, 1963, the recess 3 can be so shaped that a sound tape 4 of adequate stiffness and of a predetermined length can be introduced freely into the recess 3 by being pushed—and can be pulled out of the recess 3—just by the driving action of elements outside the cassette.

An aperture 5 extending from a cassette edge to the recess 3 at a tangent to the periphery thereof enables the tape 4 to be wound and unwound for co-operation with a recording or playing head (not shown).

Figure 6:
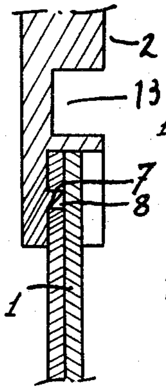
FIGS. 6 and 7 are sections on the lines VI—VI and VII—VII respectively of FIG. 4.
Figure 7:
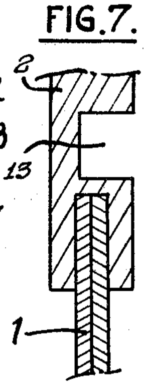
Figures 8, 9, 10, 11:
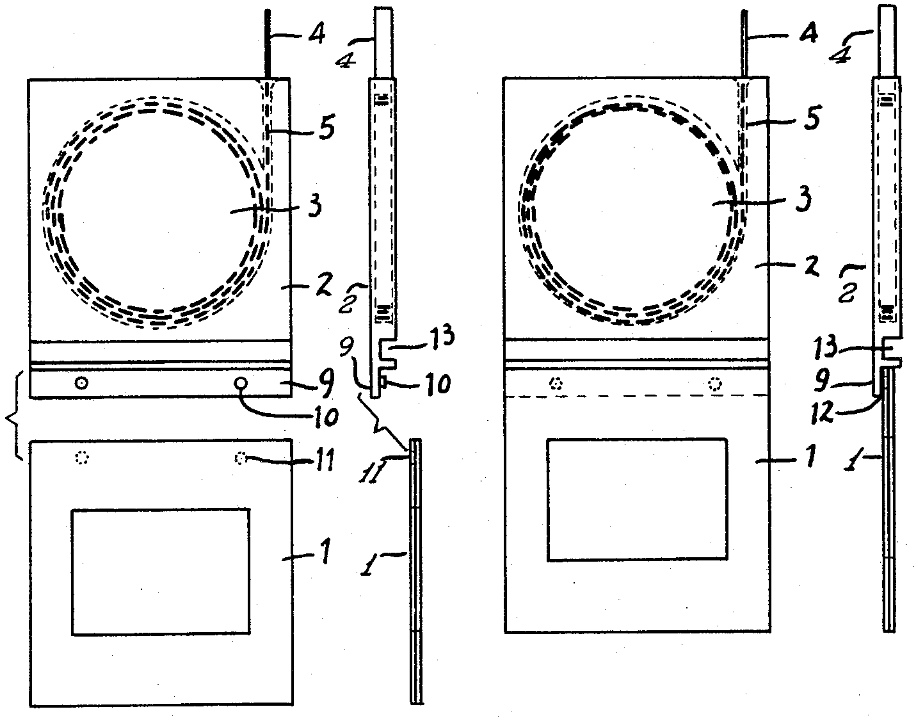
FIG. 8, 9, 12 and 12A are front and side views of two permanently connected systems, the cassette and the slide frame being separate.
FIGS. 10, 11, 13 and 13A are similar views but with the two elements assembled.
Figures 12, 12A, 13, 13A:
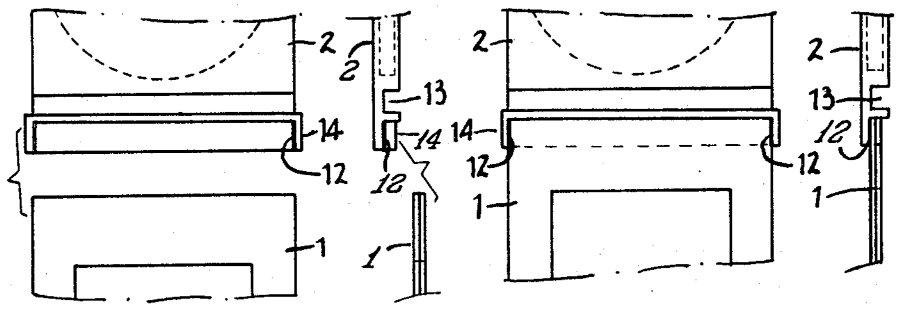

According to the invention, means are provided such that the standard slide frame 1 and the cassette 2 can readily be coupled together semi-permanently or permanently. To this end, the bottom portion of the cassette 2 can be formed with a groove or the like 6 engageable by the top part of the frame 1. About halfway up the height of one surface of the groove 6, preferably the rear surface, is a rib 7 which is opposite a groove or the like 7[1] in the outer surface and which is adapted to engage in an aperture 8 (FIG. 1) in the frame 1 when the same has been pushed home in the groove 6 (FIG. 6). Engagement of the rib 7 in the aperture 8, as well as retaining the slide frame in the groove 6, positions the slide frame transversely relatively to the cassette, the dimnsions of the rib 7 being adapted to the dimensions of the aperture 8 for this purpose.

Clearly, the slide frame and the cassette can subsequently be readily separated from one another by separating the walls of the groove to release the rib 7 from the aperture 8. In this case the connection between the frame and the cassette is semi-permanent.

Referring now to FIGS. 8–13A, a permanent connection can be provided, for instance, by adhesion. To this end, the cassette 2 can have a tongue 9 which can have two centering pins or pegs or dowels or the like 10 engageable in matching apertures 11 in the top edge of the slide frame 1. The cassette can also have dowels, pegs of the like 14 for lateral location of the slide frame (FIGS. 12, 12A, 13, 13A). The permanent connection can be made by adhesion, for instance, using adhesives 12 (FIGS. 11–13A).

Systems of this kind are very suitable for projection by a projector of the kind described and protected by a patent application filed by the same applicant simultaneously with this present application. In this event, the cassette 2 can, with advantage, be formed near its bottom edge with a groove 13 adapted to co-operate with the horizontal tongue of the projector frame, in order that the cassette may slide when introduced into the projector, as set forth in Belgian Patent No. 647,272 filed Apr. 29, 1964.

The operative position of this system—i.e., the system formed by the cassette and the slide 1—is such that placing the system in the operative position ensures that the slide frame is brought into the operative position relatively to the means for projecting the slide while simultaneously the cassette is brought into the operative position relatively to a device for recording and playing the sound tape in the cassette.

The constructional details of the invention have been described and shown solely as non-limitative examples, and so the invention is of course of use with all kinds of cassettes for sound tapes.

Clearly, the means for assembling the cassette and slide frame can vary considerably and even be very different without departing from the scope of the invention.

I claim:

1. A system comprising a cassette having a body, means in said body defining a hollow support for a sound tape, a slide consisting essentially of a mounting frame and a transparency, said mounting frame consisting essentially of two simple cardboard frame members provided with windows and sandwiching the transparency therebetween, and means on said cassette and said transparency mounting frame to directly join together both said cassette and said mounting frame and to position the same in an accurate juxtaposed relationship lengthwise, transversely and laterally.

2. A system as claimed in claim 1 wherein said means which joins together the cassette and transparency frame includes disengageable elements to provide a detachable engagement between the transparency frame and the cassette.

3. A system as set forth in claim 2 wherein said means for joining the cassette and mounting frame together is constituted by a groove in the cassette in the bottom portion thereof, said groove being bounded by opposite surfaces one of which includes a rib resiliently engageable in an aperture in the slide frame when the edge of the slide frame is pushed into the said groove in the cassette.

4. A system as set forth in claim 1 comprising means for permanently maintaining said frame in engagement in the cassette in said juxtaposed position therewith.

5. A system as set forth in claim 4 wherein said means for permanently maintaining said frame in engagement with the cassette comprises adhesive means on the frame.

6. A system as set forth in claim 5 wherein said adhesive means is a self-adhesive which is applied to the frame prior to engagement thereof with the cassette.

7. A system as set forth in claim 4 wherein said means for permanently maintaining said frame in engagement with the cassette comprises adhesive means on the cassette.

8. A system as set forth in claim 7 wherein said adhesive means is a self-adhesive which is applied to the cassette prior to engagement thereof with the frame.

9. A system as set forth in claim 4 wherein said means for permanently maintaining said frame in engagement with the cassette comprises adhesive means on the frame and the cassette.

10. A system as set forth in claim 9 wherein said adhesive means is a self-adhesive which is applied to the cassette and the frame prior to engagement thereof.

11. A system as set forth in claim 1 wherein said cassette is formed near its bottom edge with a groove having a lower wall constituting a horizontal locating tongue for the frame.

12. A system as claimed in claim 1 wherein said means in said body defines a hollow support with at least one portion having a curved contour for a recording band, said body having a narrow slot defining a linear passage which opens tangentially into said hollow support and externally of the body to permit both entry and exit of a free length of the band, said support and passage being arranged in said body to enable the recording band to be freely inserted and removed from the housing externally of the frame.

References Cited

UNITED STATES PATENTS

| | | | |
|---|---|---|---|
| 3,177,768 | 4/1965 | Hallamore | 88—28 |
| 3,296,925 | 1/1967 | Yamamoto | 88—28 |

NORTON ANSHER, *Primary Examiner.*

RICHARD M. SHEER, *Assistant Examiner.*